United States Patent Office 3,328,098
Patented June 27, 1967

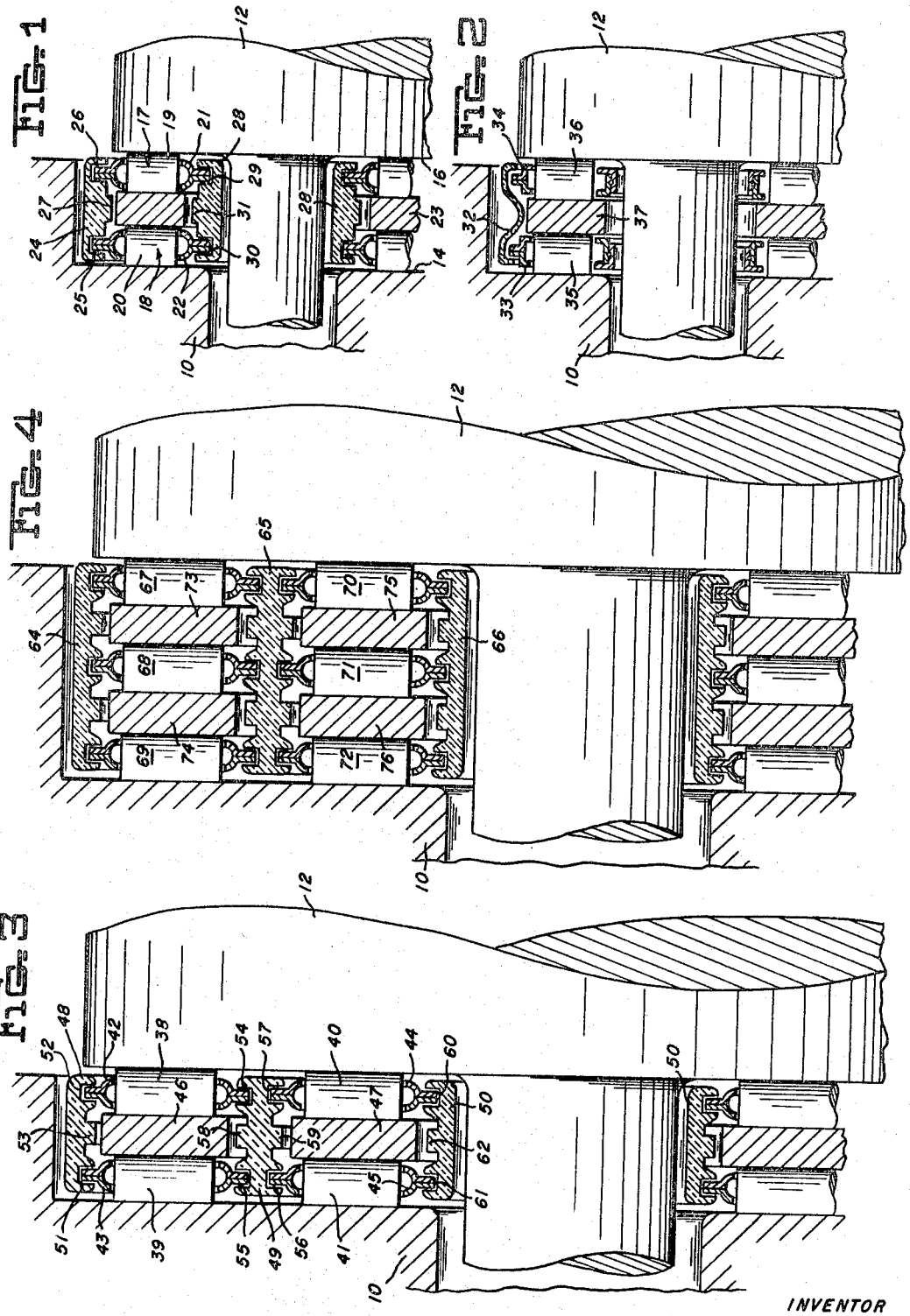

3,328,098
DIFFERENTIAL BEARING
Tadeusz Budzich, Moreland Hills, Ohio
(80 Murwood Drive, Chagrin Falls, Ohio 44022)
Filed Jan. 11, 1966, Ser. No. 519,984
7 Claims. (Cl. 308—234)

This is a continuation-in-part of application Ser. No. 270,863, filed Apr. 5, 1963, now abandoned, entitled, "Differential Bearing."

This invention relates to thrust bearings, and more particularly to a unitary thrust bearing assembly adapted to be interposed between a pair of relatively rotating members.

There have been several prior proposals for differential thrust bearing assemblies. These bearings, however, have utilized expensive precision parts which had to be individually assembled to provide the differential action. Although these bearings have found limited usage in expensive precision machinery, their cost has prohibited their use in less expensive mass-produced machinery when cost is an important consideration.

It is therefore a principal object of this invention to provide a unitary thrust bering assembly which can be inserted as a unit between relatively rotating members.

A further object of this invention is to provide a relatively inexpensive unitary differential thrust bearing unit.

Another aspect of this invention includes the provision of differential bearing modules which can be interconnected to form a unitary structure which compounds the differential action of the modules.

Still a further more specific object of this invention is to provide a differential thrust bearing assembly wherein failure of individual modular components will not cause failure of the entire bearing.

These and other objects will become apparent from the following description and drawings in which:

FIGURE 1 is a longitudinal sectional view of the embodiment of a differential thrust bearing according to this invention interposed between relatively rotating members;

FIGURE 2 is a longitudinal sectional view of differential thrust bearing similar to that shown in FIGURE 1 but using a different type of harness.

FIGURES 3 and 4 are longitudinal sectional views of different assemblies of differential thrust bearings.

Referring now to the drawing, in FIGURE 1 a thrust bearing assembly is shown interposed between a stationary member 10 and a rotating member 12. The members 10 and 12 have respectively plane surfaces 14 and 16 each of which is normal to the axis of rotation of the rotating member 12, and constitute raceways for the bearing assembly.

The bearing assembly includes two individual self-contained thrust bearings generally designated as 17 and 18. Each bearing assembly 17 and 18 includes a set of rollers 19 and 20 respectively rotatably retained in circumferentially spaced slots in bearing cages 21 and 22. Differential plate 23 is interposed between and in operational engagement with rollers 19 and 20 of thrust bearings or roller bearing assemblies 17 and 18. An outer harness 24, equipped with guiding grooves 25 and 26, slidably engages cages 21 and 22. The outer harness 24 is equipped with central rib 27 circumferentially guiding in sliding engagement the differential plate 23. An inner harness 28 is provided and equipped with guiding grooves 29 and 30 slidably engaging cages 21 and 22 respectively on their inner peripheries. The inner harness 28 is equipped with a rib 31 which is in sliding engagement with the differential plate 23.

Both the inner harness 28 and the outer harness 24 are preferably constructed from a yieldable elastic material such as nylon or other plastic so that the cages of thrust bearings 17 and 18 can be snapped into their respective guiding grooves. The guiding grooves, of both the inner and outer harnesses, maintain the thrust bearings 17 and 18 in contact with thrust surfaces of the differential plate 23 while circumferentially guiding the thrust bearings 17 and 18 and differential plate 23 in respect to each other.

The cages 21 and 22 of thrust bearings 17 and 18 are permitted to rotate in respective guiding grooves 26, 25, 29 and 30. The differential plate 23 is freely rotatable with respect to the outer harness 24 and the inner harness 28 while being circumferentially guided by the ribs 27 and 31.

With the arrangement of FIGURE 1 when the member 12 is rotated the differential plate 23 will rotate at a speed equal to one half the difference in speed of rotation of members 10 and 12, the cage 21 of thrust bearing 17 will rotate at three quarters the difference in speed of rotation of members 10 and 12, and cage 22 will rotate at one quarter the difference in speed of rotation of members 10 and 12. The speed of rotation of the rollers 19 and 20 will then be half what it would be if there were but a single row of rollers between the members 10 and 12.

Referring now to FIGURE 2 an outer harness 32, slidably guides cages 33 and 34 of thrust bearings 35 and 36 while circumferentially guiding differential plate 37. The outer harness 32 is preferably made of yieldable elastic material such as nylon or other plastic to permit assembly of the differential bearing out of its individual components.

Referring now to FIGURE 3 a differential bearing assembly comprises four thrust bearings 38, 39, 40 and 41 having cages 42, 43, 44 and 45 respectively. A first differential plate 46 is interposed between thrust bearings 38 and 39 and a second differential plate 47 is interposed between thrust bearings 40 and 41. Thrust bearings 38, 39, 40 and 41 and differential plates 46 and 47 are circumferentially and laterally guided in respect to each other by outer harness 48, intermediate harness 49 and inner harness 50. The outer harness 48 is equipped with guiding slots 51 and 52 slidably engaging cages 43 and 42. The outer harness 48 is also provided with rib 53 circumferentially guiding, in sliding engagement, the differential plate 46. The intermediate harness 49 is equipped with guiding grooves 54, 55, 56, and 57, slidably guiding cages 42, 43, 44, and 45. The intermediate harness 49 is also provided with ribs 58 and 59 circumferentially guiding, in sliding engagement, differential plates 46 and 47 respectively. The inner harness 50 is equipped with guiding grooves 60 and 61 slidably engaging cages 44 and 45 of thrust bearings 40 and 41. The inner harness is also provided with rib 62 circumferentially guiding in sliding engagement the differential plate 47. The outer harness 48, intermediate harness 49 and inner harness 50 are preferably made of yieldable elastic material such as nylon or other plastic to permit a differential bearing assembly of FIGURE 3 be made of its individual components. Such an assembly not only permits reduction in rotational speed of the rollers, as explained, when referring to FIGURE 1, but also permits the increase in load capacity of the differential bearing by incorporation of the additional thrust bearings into a self-contained and functionally integrated differential thrust bearing assembly.

FIGURE 4 shows a differential thrust bearing assembly integrating by use of outer, intermediate and inner harnesses 64, 65, and 66 respectively, six individual thrust bearings 67, 68, 69, 70, 71 and 72, and four differential plates 73, 74, 75, and 76 into a single self-contained unit. This assembly will further reduce, through its differential action, the rotational speed of individual rollers and therefore increase potential life of differential bearing assembly.

In this case the differential plates 73 and 75 will move at a speed equal to two-thirds the difference in rotational speed between members 10 and 12 and differential plates 74 and 76 will move at a speed equal to one-third the difference in speed between the members 10 and 12. Likewise, the cages of bearings 67 and 70 will move at five-sixths the difference in speed between the members 10 and 12, the cages of bearings 68 and 71 will move at a speed equal to one-half the difference in speed between the members 10 and 12, and the cages of bearings 69 and 72 will move at a speed equal to one-sixth of the difference in speed between the members 10 and 12. Although the lateral compounding as shown in FIGURE 4 is shown as a modification of FIGURE 3 in which thrust bearings are radially compounded it is obvious that embodiments similar to FIGURES 1 and 2 can be provided with additional modules of differential plates and thrust bearings in laterally spaced relationship. Also, the compounding is not limited to three sets of thrust bearings and two differential plates; additional plates and thrust bearings will correspondingly reduce the speed of the plates and cages.

The failure of any individual thrust bearing of arrangement shown in FIGURE 4 will not constitute the functional failure of the differential bearing assembly since it will bring the remaining thrust bearings to rotational speed levels equivalent to assembly shown in FIGURE 3. Likewise, the functional failure of individual thrust bearings in the assembly of FIGURE 3 or 2 or 1 will not constitute a functional failure of the total bearing assembly since the remaining thrust bearing or bearings will come to a level of rotation equal to that of a single module of rollers between two rotating members.

While several embodiments of my invention have been shown and described it will be apparent that other adaptations and modifications may be made without departing from the scope of the following claims.

What is claimed is:

1. A differential thrust bearing assembly for use between a pair of relatively rotatable members comprising, at least first and second laterally spaced roller bearing assemblies, each roller bearing assembly including a cage and a plurality of circumferentially spaced rollers rotatably supported by said cage, differential plate means interposed between the rollers of each adjacent roller bearing assembly, and mounting means disposed to slidably supoprt said cages in said laterally spaced relationship and circumferentially guide said bearing assemblies and differential plate means, whereby to provide a differential action between said differential bearing components while maintaining said components in assembled relationship.

2. The combination of claim 1 further characterized by said means to support said cages being a yieldable material whereby a differential thrust bearing assembly can readily be made from its individual components.

3. The combination of claim 1 further characterized by said means to support said cages having guiding slot means slidably engaging said individual cages of said thrust bearings.

4. The combination of claim 1 further characterized by said mounting means having rib means circumferentially guiding in sliding engagement said differential plate means.

5. The combination of claim 1 further characterized by third and fourth roller bearing assemblies radially spaced from said first and second roller bearing assemblies respectively, second differential plate means interposed between the rollers of said roller bearing assemblies and radially spaced from said first differential plate means.

6. The combination of claim 5 further characterized by fifth and sixth roller bearing assemblies laterally spaced from the second and fourth bearing assemblies respectively, third differential plate means interposed between said second and fifth roller bearing assemblies and laterally spaced from said first differential plate means, and fourth differential plate means interposed between the fourth and sixth bearing assemblies and laterally spaced from said second differential plate means.

7. The combination of claim 1 further characterized by a third roller bearing assembly laterally spaced from said second roller bearing assembly, and differential plate means interposed between the rollers of the second and third roller bearing assemblies.

References Cited

UNITED STATES PATENTS

| | | | |
|---|---|---|---|
| 799,765 | 9/1905 | Tweeden | 309—174 |
| 3,031,239 | 4/1962 | Pitner | 308—235 |

MARTIN P. SCHWADRON, *Primary Examiner.*

FRANK SUSKO, *Examiner.*